Figure 3:
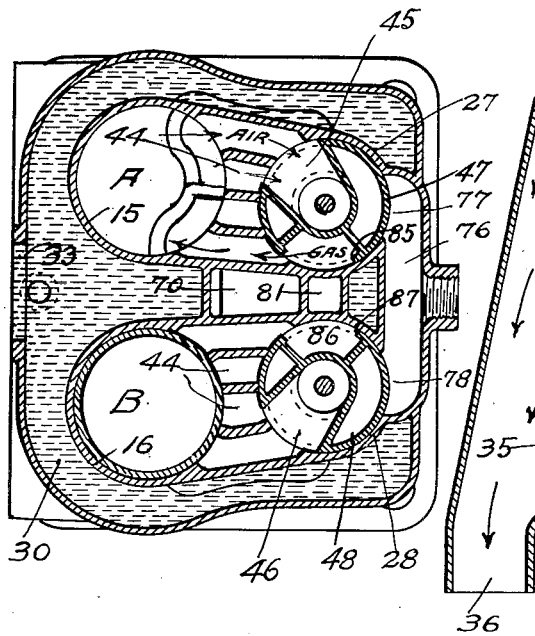

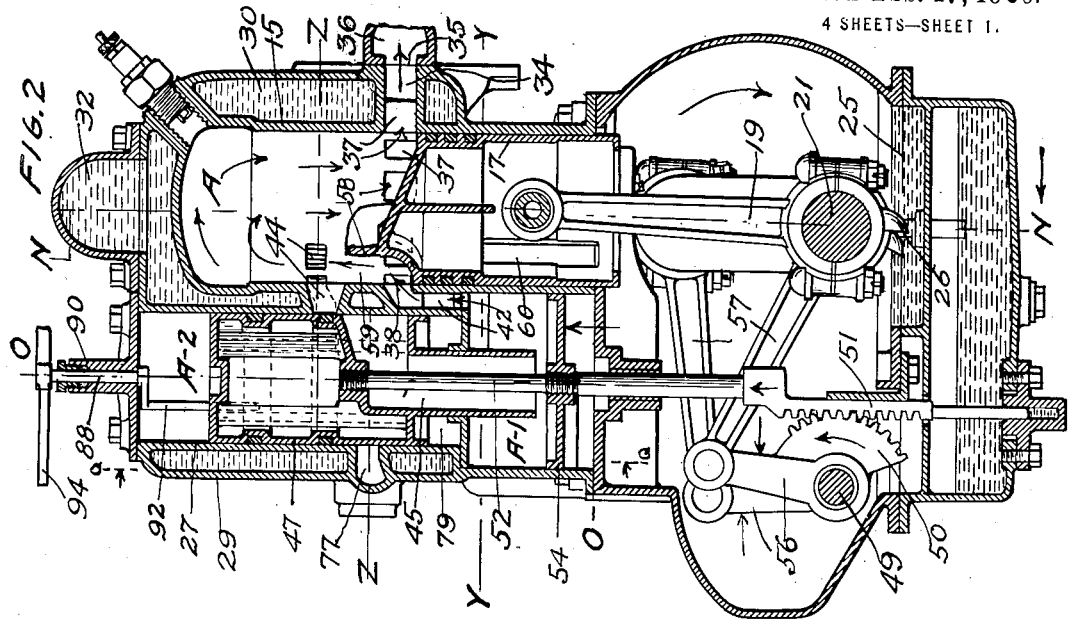

J. JESSEN.
INTERNAL COMBUSTION ENGINE AND METHOD OF CHARGING THE SAME.
APPLICATION FILED MAR. 21, 1916.
1,330,874.
Patented Feb. 17, 1920.
4 SHEETS—SHEET 3.
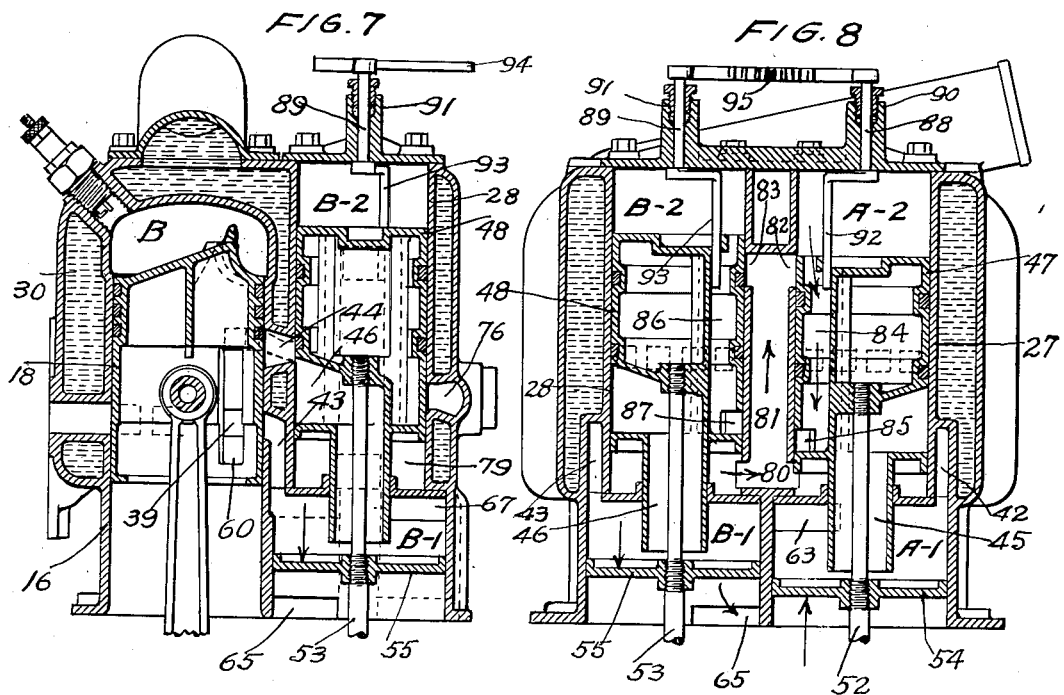
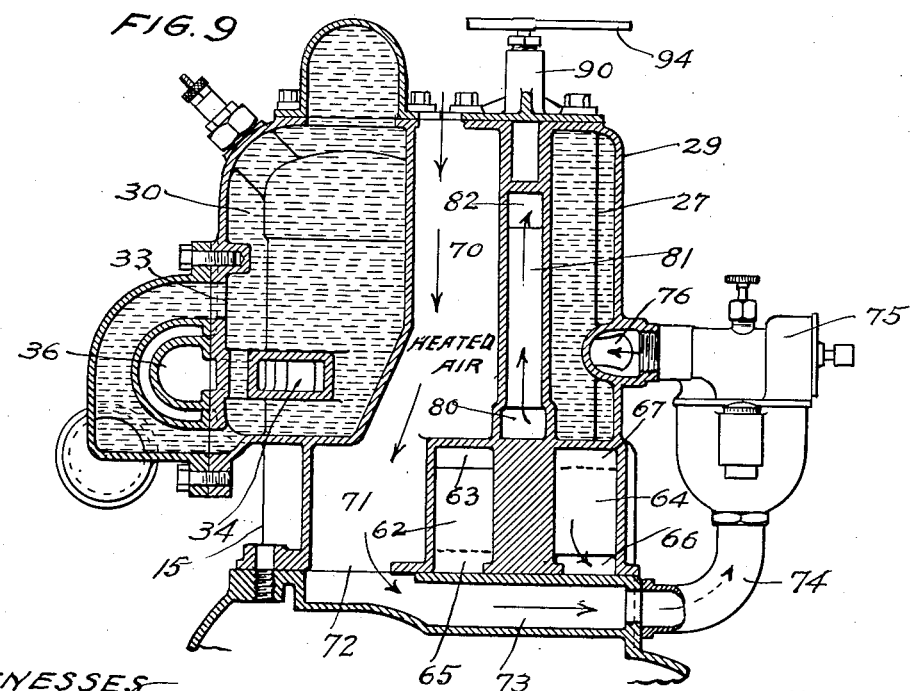

J. JESSEN.
INTERNAL COMBUSTION ENGINE AND METHOD OF CHARGING THE SAME.
APPLICATION FILED MAR. 21, 1916.
1,330,874.
Patented Feb. 17, 1920.
4 SHEETS—SHEET 4.
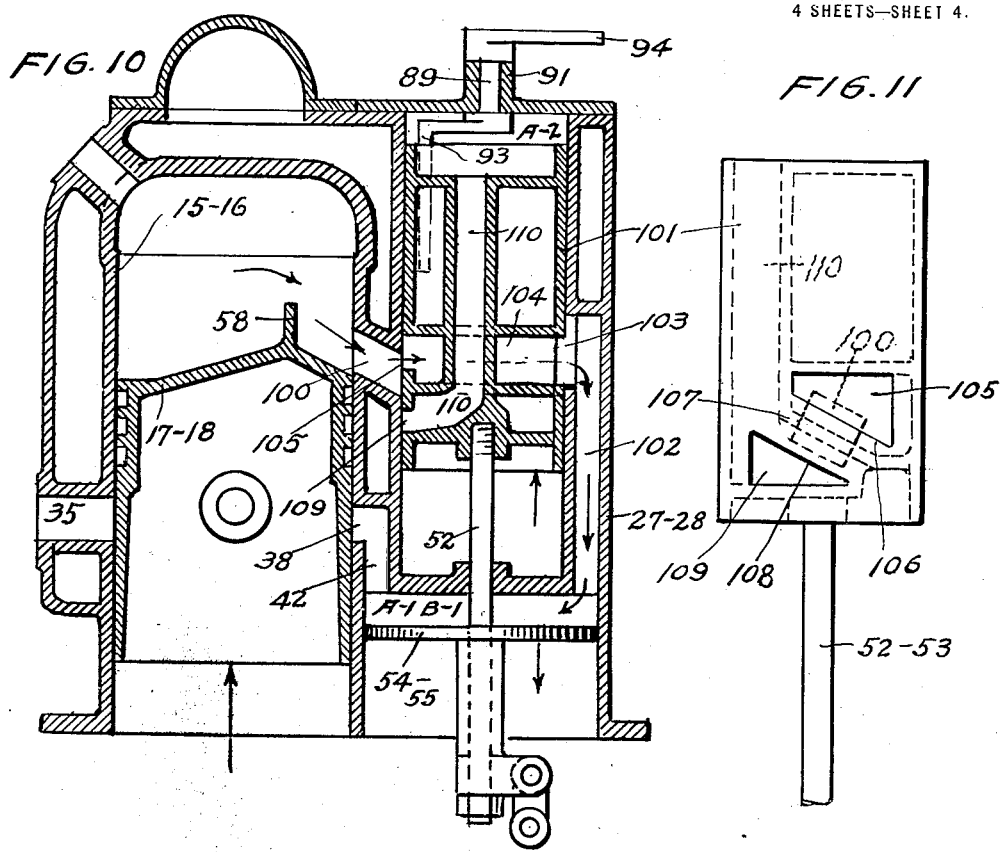
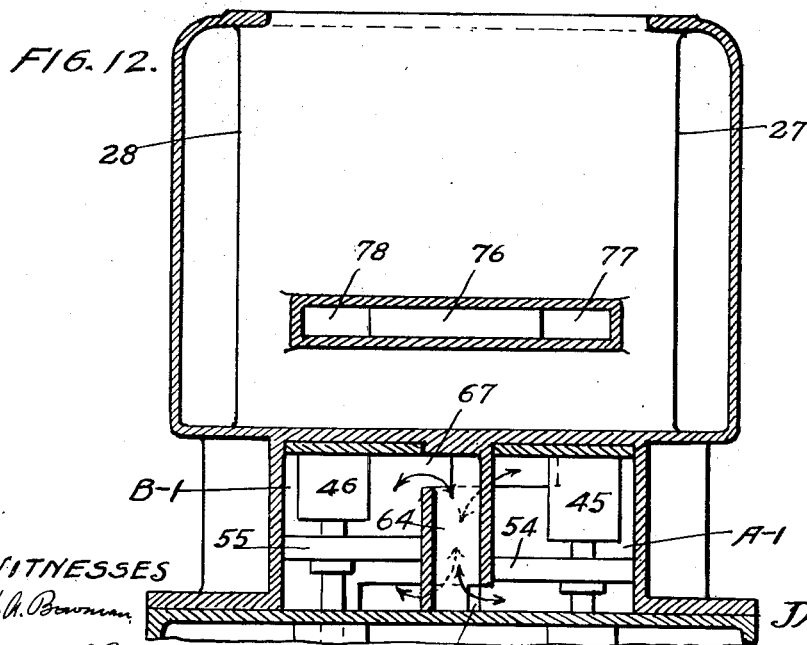
WITNESSES
INVENTOR.
JAMES JESSEN.
ATTORNEY.

UNITED STATES PATENT OFFICE.

JAMES JESSEN, OF MINNEAPOLIS, MINNESOTA, ASSIGNOR OF ONE-HALF TO JAMES A. McNULTY, OF MINNEAPOLIS, MINNESOTA.

INTERNAL-COMBUSTION ENGINE AND METHOD OF CHARGING THE SAME.

1,330,874. Specification of Letters Patent. Patented Feb. 17, 1920.

Application filed March 21, 1916. Serial No. 85,573.

*To all whom it may concern:*

Be it known that I, JAMES JESSEN, a citizen of the United States, residing at Minneapolis, in the county of Hennepin and State of Minnesota, have invented certain new and useful Improvements in Internal-Combustion Engines and Methods of Charging the Same, of which the following is a specification.

My invention relates to internal combustion engines and to the method of charging the cylinder of the same with explosive mixture and has for its object to provide in combination with the explosion cylinder of an internal combustion engine preferably what is known as the two-cycle type, means for completely scavenging the cylinder after explosion so as to entirely displace the gases of combustion and fill the cylinder with air and thereafter mixing with the air in the cylinder a certain portion of combustible, which last step may be effected after partial withdrawal of some of the air theretofore introduced into the cylinder.

It is also an object of my invention to provide a gas engine having an ordinary explosion cylinder in which the power piston operates and which is provided with an exhaust port on one side thereof and one or more inlet ports on opposite sides of the cylinder from the exhaust port and preferably spaced one above another along an element of the cylinder in combination with a second cylinder having therein certain chambers and pistons whereby the air necessary to replace the burnt gases in the explosion cylinder may be supplied at the proper time and in proper quantities to the explosion cylinder and may thereafter be withdrawn from said cylinder, and whereby the combustible material may be developed into a carbureted explosive mixture of very great richness which will be injected into the air filled explosion cylinder at a desired point after the exhaust cylinder has been closed and the power piston is moving upward in its compression stroke.

It is a further object of my invention to provide means for regulating the relative amounts of air and gas, by gas meaning the rich carbureted combustible heretofore referred to, which will finally be retained in the explosion cylinder. This regulation is preferably effected by adjusting the position of one of the pistons in the second cylinder so that the ports therein are changed in their relative position to the inlet port or ports of the power cylinder.

It is a further object of my invention to provide in connection with the motor embodying means for effecting the method or process above referred to a particularly simple and efficient cooling means which embodies not only a circulating system but also the air and gas which are taken into the combustion cylinder, the gas being thereby preheated and therefore better fitted for producing uniformly efficient combustion.

The full objects and advantages of my invention will appear in connection with the detailed description thereof and are particularly pointed out in the claims.

In the drawings illustrating the application of my invention in one form,—

Figure 4:
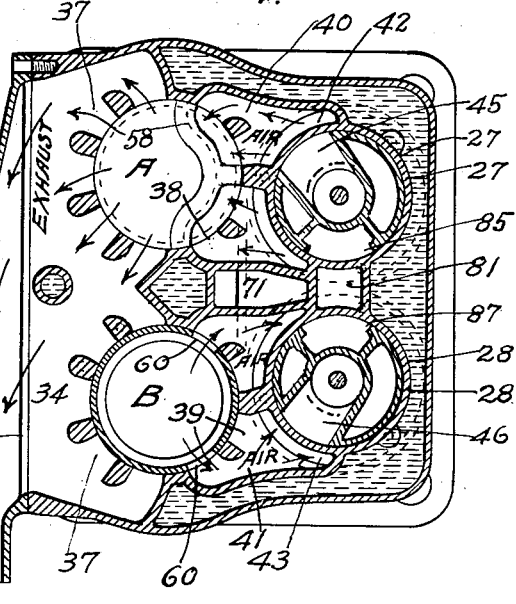
Figure 5:
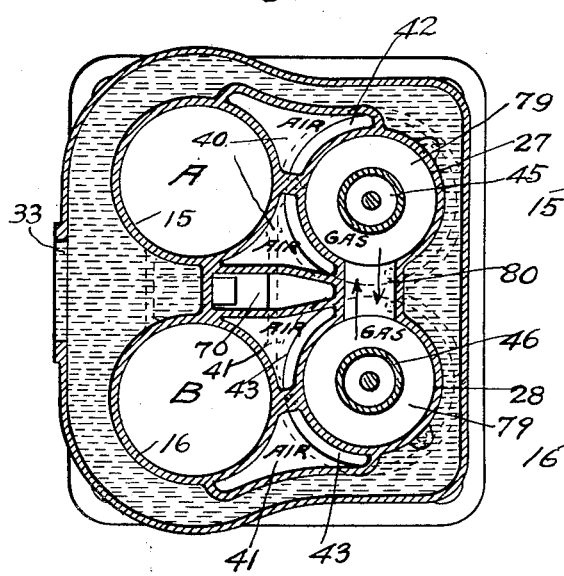
Figure 6:
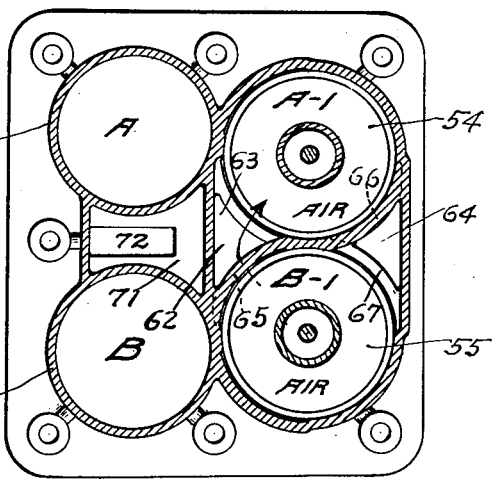

Figure 1 is a sectional elevation of an internal combustion engine embodying means for carrying out my improved process, said section being taken through the longitudinal extent of the crank shaft. Fig. 2 is a sectional elevation taken through one of the power cylinders and across the crank shaft. Fig. 1 is taken on line N—N of Fig. 2 and Fig. 2 on line V—V of Fig. 1. Fig. 3 is a sectional plan view of a two cylinder internal combustion engine having a coördinated set of instrumentalities for carrying out my process taken in the position of line Z—Z of Fig. 2. Fig. 4 is a similar view taken on line X—X of Fig. 1. Fig. 5 is a similar view taken on line W—W of Fig. 1. Fig. 6 is a similar sectional plan taken on line Y—Y of Fig. 2. Fig. 7 is a sectional elevation taken on line P—P of Fig. 1. Fig. 8 is a sectional elevation taken on line O—O of Fig. 2. Fig. 9 is a sectional elevation taken on line M—M of Fig. 1. Fig. 10 is a sectional elevation and Fig. 11 a detached view of a gas controlling piston showing a preferred form of controlling the relative amounts of gas and air which may pass to the combustion chamber. Fig. 12 is an elevational sectional view taken on line Q—Q of Fig. 2.

In the form of my invention illustrated and described I preferably employ a pair of explosion cylinders 15, 16 having therein pistons 17, 18 connected by piston rods 19, 20 with a crank shaft 21 operating in a housing or crank case 22 which is open to atmosphere through ports 23 and 24. In the bottom of the crank case is oil, as indicated at 25, which is taken to the bearings by means of cups 26 on the lower ends of the crank rods which dip into the oil at each reciprocation of the rods. The combustion chambers in cylinders 15 and 16 are designated A and B. Back of each combustion cylinder are separate cylinders 27 and 28, respectively, each provided with a lower chamber $A^1$ and $B^1$, respectively, and an upper chamber of smaller diameter $A^2$ and $B^2$, respectively. As clearly shown in Figs. 1, 3 and 5 an outer casing 29 forms a water jacket which incloses explosion chambers A and B and the upper secondary chambers $A^2$ and $B^2$. The water circulating chamber 30 formed by casing 29 extends through an elongated opening 31 at the top into an enlarged outlet pipe 32. A correspondingly large inlet opening 33 is formed at the bottom of chamber 30, as clearly shown in Figs. 3 and 5. It will thus be seen that a large circulating area entirely surrounding the combustion chambers A and B and the charging chambers $A^2$ and $B^2$ is provided with large inlet passageway at the bottom and large outlet passageway opening entirely across the top, thus insuring ready and natural circulation without requiring any pump.

As best shown in Figs. 2, 4 and 9, an extended exhaust chamber 34 opens through an elongated opening 35 into an exhaust pipe 36 and through a multiplicity of ports 37 into the combustion chambers A and B.

Having reference to Figs. 2 and 4 it will be observed that a plurality of inlet openings 38 and 39 are provided from combustion chambers A and B into a series of air passages 40 and 41, which connect through vertical passageways 42 and 43 with chambers $A^1$ and $B^1$ respectively. Furthermore, having reference to Figs. 2 and 3, another set of inlet ports 44 extend into combustion chambers A and B and are adapted to be connected with chambers $A^1$ and $B^1$ through passageways 45 and 46 formed in the body of pistons 47 and 48, which operate respectively in the chambers $A^2$ and $B^2$ of cylinders 27 and 28. The ports 44 also, as will hereafter be pointed out, are adapted to be put into direct communication with chambers $A^2$ and $B^2$ when said chambers are filled with gas under compression for admitting the requisite amount of said gas into combustion chambers A or B, said chambers having been previously filled with air which has replaced the burnt gases after exhaust from an explosion.

As shown in Fig. 3, the ports 44 comprise continuous passageways extending from combustion chambers A and B to chambers $A^2$ and $B^2$, and opening and closing of said ports 44 to permit passage of air or gas according to the conditions involved is effected by reciprocation of the pistons 47 and 48. This may be effected in various ways, as illustrated in Fig. 2. A shaft 49 has loose thereon segments 50 meshing with racks 51 secured to rods 52 and 53 which in turn are secured to pistons 47 and 48 and also to pistons 54 and 55 which operate in chambers $A^1$ and $B^1$, as clearly shown in Figs. 1 and 8. The racks 50 have arms 56 fast therewith connected by links 57 which are journaled to the respective cranks. The arms 57 although extending at one side and generally transversely to the main crank rods 19 and 20 have their point of pivotal connection with arms 56 advanced somewhat from the angular center of oscillation of said arms 57 therewith. In the position of the parts as shown in Fig. 2 the piston 17 has just reached the limit of its outgoing stroke and has started to return. The charging piston 47 has already moved up for a portion of its stroke and has considerably more than half of its up stroke yet to make. It will thus be seen that the piston 47 moves up and down nearly concurrently with piston 17 but always somewhat in advance of such movement.

The exhaust ports 37 and the sets of inlet ports 38 39 and 44 are all directly controlled by movement of the main pistons 17 and 18 and it will be observed that exhaust ports 37 and lower series of inlet ports 38 and 39 are open at the same time. Air at this time, as shown by the arrows in Fig. 2, is entering chamber A from chamber $A^1$ through passageway 42 and ports 38, the upwardly moving piston 54 having slightly compressed the air in chamber $A^1$ so that this air readily follows the burnt gases as the same exhaust through ports 37, completely displacing said burnt gases and filling the combustion chamber A, being directed upwardly along the walls of chamber A by a baffle 58 which extends upwardly from head of piston 17 or 18 leaving a passageway 59 between said baffle and the wall of the chamber. As shown by the arrows in Fig. 1, air is at the same time entering chamber $B^1$ above piston 55 through port 60 in piston 18 and ports 24 and 39 in cylinder 16 from which the air enters chamber $B^1$ above piston 55 through passageway 43. As best shown in Figs. 6, 9 and 12, passageways 62 and 64 are formed between the cylinders forming the air chambers $A^1$ and $B^1$. The upper portion of passageway 62 is provided with a port 63 entering the upper portion of chamber $A^1$ and with a port 65 entering the lower portion of chamber $B^1$, similarly passageway 64 is provided with a port 66 entering the lower portion of chamber $A^1$ and a port 67 entering the upper portion of chamber $B^1$. It will thus be apparent that the upper portion of chamber $A^1$ is always in communication with the lower portion of chamber $B^1$ and the upper portion of chamber B¹ is always in communication with the lower portion of chamber A¹, the respective pistons 54 and 55 separating said respective upper and lower portions of the chambers.

As heretofore noted and as shown in Fig. 1, pistons 17 and 18 are provided with sets of ports 60 such that when the pistons are in their upper position connection is established through such ports and the casing ports 23 or 24 with the outside atmosphere and the interior of chambers A¹ or B¹ through the cylinder ports 38 and 39. It is to be observed that piston 54 will be going up when piston 55 is going down and vice versa. These pistons are double acting so that in the movement thereof suction and compression is alternately effected on opposite sides of the piston. The up stroke of each of these pistons has compression above and suction below the piston. The down stroke reverses this and has suction above and compression below the piston. Since the portions of the chamber respectively above and below the pistons in one chamber are in communication with the opposite sections or those below and above the piston and the other chamber, it will be seen that air entering one chamber above one of the pistons on the downward or suction stroke of such piston will enter the other chamber below the other piston on the corresponding upward suction stroke of that piston and air from below the first named piston will be compressed and pass into the chamber above the second piston at the time of its upward or compression stroke from which the air may go to the combustion chamber, which is thus supplied with air pumped by both pistons from air chambers A¹ and B¹.

Having reference particularly to Figs. 3, 6 and 9, it will be observed that a passageway 70 is provided in the central portion of the space between the four cylinders 15, 16, 27 and 28, which passageway extends into a chamber 71 adjacent the casing forming the air chambers A¹ and A². From the bottom of chamber 71 a port 72 leads to a passageway 73 which by a pipe 74 is placed in connection with the carbureter 75 secured to the back of the water-jacket casing 29 but in this casing is a branch passageway 76 which communicates through ports 77 and 78 with the interior of cylinders 27 and 28. As clearly shown in Fig. 3, the pistons 47 and 48 control the ports 77 and 78. When either of said pistons has been moved into its upward position, creating a vacuum in the gas chamber 79 below such piston, the carbureted fuel mixture from the carbureter will be drawn into said gas chamber 79. The two gas chambers 79 are connected by a passageway 80, as shown in Figs. 5, 8 and 9, and a vertical passageway 81 in turn between cylinders 27 and 28 in turn connects with chambers A² and B² through ports 82 and 83, as clearly shown in Fig. 8, the chambers A² and B² being above pistons 47 and 48. It will be seen that the air passage 70, the carbureting manifold 76, the gas chambers 79, the communicating passageway 80 and the vertical passageway 81 are all in the body of the engine proper, more or less surrounded by the water in the circulating system. The carbureted gas or explosive mixture will therefore have become thoroughly heated before it enters chamber A² through port 82 or chamber B² through port 83. It is to be noted also that the gas is subject to alternate compression and vacuum under the lower portion of pistons 47 and 48 during all of the period it may be caused to travel from one gas chamber 79 to the other, and vice versa, entering chamber A² or B², as the case may be, whenever piston 47 uncovers port 82 or piston 48 uncovers port 83. From the above considerations it will be seen that the gas chambers 79 are alternately compression chambers and vacuum chambers, and likewise the chambers A² and B² are alternately compression chambers and vacuum chambers. The subjecting of the gas in these chambers and passageways to the movements above referred to will have the effect of perfectly disintegrating the oils, even of the heavier type. From the chamber A² the gas may travel through a passageway 84 to a port 85 at the lower end of said passageway, which at the proper time is brought opposite some of the ports 44 opening into combustion chamber A. Similarly, gas from chamber B² travels through a passageway 86 to a port 87 near the bottom of said passageway, which at the proper time is brought into registry with some of the inlet ports and passageways 44 entering the combustion chamber B.

From an inspection of Fig. 3 it will be noted that in this form the port for air passage 45 and for gas passage 84 of piston 47, and the port for air passage 46 and for gas passage 86 of piston 48 are in a common horizontal plane so that, as clearly shown, for combustion chamber A air and gas may simultaneously be entering said combustion chamber through ports 44. Since the gas is at the greater pressure this will ordinarily result in a displacement of air from the combustion chamber as the gas enters. Since the respective air and gas ports are in a common circumferential plane forming the openings into passageways 44, it is obvious that by rotating pistons 47 or 48 the gas admission and air admission openings may be actually and relatively varied at will so as to increase and decrease the amount of gas admitted and correspondingly increase or decrease the amount of air which may be reconducted from the combustion chamber. The oscillation of the cylinders may readily be effected by the following means:— Shafts 88 and 89 are journaled in bearing extensions 90 and 91 on the casing cover of the cylinders A² and B². A finger 92 offset from shaft 88 slides in a socket for the same extending into passageway 84 as piston 47 is reciprocated. A similar finger 93 slides in passageway 86 of piston 48. By means of a lever arm 94 fast on shaft 88 or shaft 89, such shaft may be rocked which will rock the finger 92 or 93 and turn piston 47 or 48 on the rod 52 or 53 until the relative degree of adjustment is effected. If desired the two shafts 88 and 89 may be geared together so as to be moved in unison as indicated at 95 in Fig. 8.

In the form of adjustment just referred to in Fig. 3 the air and gas passages may be simultaneously in connection with the combustion chamber, which may result under some conditions in escape of gas with the air leaving through passage 45. A preferred form of communication between the air chamber and the combustion chamber is shown in Figs. 10 and 11. As there illustrated, a single inlet port 100 is provided into each of the combustion chambers. The chambers A¹ and B¹ not only communicate with inlet ports 38 in the same manner as in the constructions shown in the other figures but a different type of piston 101 operates in chambers A² and B², which chambers are closed at the bottom and have a vertical air passageway 102 extending along the side of cylinders 27 or 28 which is opposite the explosion cylinders 15 and 16, said passageways 102 opening through a port 103 into the central portion of chambers A² and B². A passageway 104 extends transversely across the central portion of piston 101 which throughout a considerable part of the stroke of the piston opens through port 103 into air passageway 102. The passageway 104 connects with a port 105 in the wall of piston 101 which port is provided with an oblique wall 106 separated by a partition 107 from a similar oblique wall 108 of a gas port 109 which communicates through a passageway 110 in piston 101 with the upper portion of chamber A² or B². The relation of ports 105 and 109 and the parallel oblique walls 106 and 108 thereof is best shown in Fig. 11. The strip of piston wall 107 which separates these ports is of substantially the same dimension as the inlet port 100 which has its upper and lower walls extending parallel with walls 106 and 108. It will be seen from the above that as the piston 101 reciprocates it may first open communication of inlet port 100 with air port 105 and then with gas port 109, or vice versa, but communication cannot be effected with both the air port and the gas port at the same time. By rotating piston 101, which is effected by the same means already described for rotating pistons 47 and 48, the time and extent of opening of air port 105 and gas port 109 into inlet port 100 may be varied actually and relatively, due to the oblique extent of walls 106 and 108 and the consequent substantially wedge-shaped form of ports 105 and 109. These ports are offset circumferentially on the cylinder of the piston so that in one position of adjustment the gas port only may be opened to inlet port 100 and from this maximum feed of gas the degree of feed may be varied down to any desired minimum feed of gas and maximum opening of the air ports, such maximum opening of air ports permitting air in the explosion chamber to escape through passageways 104 and 102, as indicated by the arrows, so that an explosive charge of minimum efficiency may finally be received in the explosion chambers A or B.

I claim:

1. The method of charging internal combustion engines which consists in replacing the burnt gases in the combustion chamber with air at the time of exhaust, conducting additional air into the combustion chamber after the exhaust port is closed and during the compression stroke, withdrawing a predetermined quantity of this air out of the combustion chamber during the compression stroke of the engine, and thereafter and during the compression stroke of the engine injecting into the combustion chamber a desired quantity of combustible to be mixed with the air and form the combustion charge.

2. The method of charging internal combustion engines which consists in replacing burnt gases in the combustion chamber with air at the time of exhaust, withdrawing a predetermined quantity of this air out of the combustion chamber during the compression stroke of the engine, thereafter and during the compression stroke of the engine injecting into the combustion chamber a desired quantity of combustible to be mixed with the air and form the combustion charge, and regulating the amount of withdrawal of air and the amount of combustible injected into the explosion chamber to accord with the load and speed of the motor.

3. An internal combustion engine comprising a cylinder having exhaust and admission ports in a common circumferential plane and an additional set of admisssion ports in another circumferential plane, a piston in said cylinder controlling all of said ports, means to supply air under pressure to both of said sets of admission ports, and means to supply explosive mixture under pressure to the last-named admission ports only.

4. A two-cycle internal combustion engine comprising a cylinder having exhaust ports and two sets of admission ports, a piston in said cylinder controlling all said ports, means independent of said piston for injecting air into the cylinder through both sets of admission ports, and means for thereafter injecting explosive mixture into the cylinder through one of said sets of admission ports.

5. A two-cycle internal combustion engine comprising a cylinder having exhaust ports and two sets of admission ports, a piston in said cylinder controlling all of said ports, means independent of said piston for injecting air into the cylinder through both sets of admission ports, and means for injecting explosive mixture into the cylinder through one only of said sets of admission ports.

6. An internal combustion engine comprising a cylinder having an admission port, means to supply air under pressure through said port to the cylinder, means to supply explosive mixture through said port to the cylinder, a reciprocating valve for determining the time and duration of supply of air and explosive mixture respectively to said admission port, and means to adjust said valve to vary said proportions.

7. An internal combustion engine comprising a cylinder having an admission port, a second cylinder, a reciprocating piston in the second cylinder provided with a pair of ports adapted to be successively brought into register with said admission port during the reciprocation of the piston, means for supplying air under pressure through one of said piston ports and said admission port to the cylinder, and means to supply explosive mixture under pressure through the other piston port and admission port to the cylinder.

8. An internal combustion engine comprising a cylinder having an admission port, a second cylinder, a reciprocating piston in the second cylinder provided with a pair of ports adapted to be successively brought into register with said admission port during the reciprocation of the piston, means for supplying air under pressure through one of said piston ports and said admission port to the cylinder, means to supply explosive mixture under pressure through the other piston port and said admission port to the cylinder, and means to vary the extent of opening of said respective piston ports.

9. A two cycle internal combustion engine comprising a power cylinder, a piston working in said cylinder, a crankshaft to which said piston is connected, an air pump cylinder and a combustible gas pump cylinder, a piston operating in each of said cylinders, means connected to said crankshaft for operating said last mentioned pistons at substantially ninety degrees from said power piston, inlet and outlet ports for all of said cylinders, means associated with said power piston for controlling the inlet and outlet ports of the air pump cylinder, and means associated with the gas pump piston for controlling the gas inlet port of the power cylinder.

10. A two cycle internal combustion engine comprising a power cylinder, a piston working in said cylinder, a crankshaft to which said piston is connected, an air pump cylinder and a combustible gas pump cylinder, a piston operating in each of said cylinders, means connected to said crankshaft for operating said last mentioned pistons at substantially ninety degrees from said power piston, inlet and outlet ports for all of said cylinders, means associated with said power piston for controlling the inlet and outlet ports of the air pump cylinder, means associated with the gas pump piston for controlling the gas inlet port of the power cylinder and means associated with said power piston for controlling the inlet and outlet ports of said power cylinder.

11. A two cycle internal combustion engine comprising a power cylinder, a piston working in said cylinder, a crank shaft to which said piston is connected, an air pump cylinder and a combustible gas pump cylinder, a piston operating in each of said cylinders, means connected to said crankshaft for operating said last mentioned pistons at substantially ninety degrees from said power piston, inlet and outlet ports for all of said cylinders, means associated with said power piston for controlling the inlet and outlet ports of the air pump cylinder, means for jointly controlling the gas inlet port to the power cylinder by the power piston and the pump piston.

12. A two cycle internal combustion engine comprising a power cylinder, a piston working in said cylinder, an air pump cylinder and a gas pump cylinder, a piston operating in each of said cylinders, means for reciprocating said pump pistons relative to the movement of said power piston so that when the latter completes its stroke the pump pistons are in the center of the stroke, inlet and outlet ports for the air pump cylinders controlled by the power piston, inlet ports from the gas pump cylinder to the power cylinder substantially midway in the power cylinder and controlled by both the gas pump piston and the power piston, and inlet and outlet ports for the power cylinder controlled by the power piston.

13. An internal combustion engine comprising a power cylinder, two gas pump cylinders, double acting pistons working in said gas pump cylinders in opposite directions, common inlet ports at the same ends of said gas pump cylinders connected with the fuel supply and controlled by said pistons, outlet ports from said ends of said gas pump cylinders connected to a common passageway, inlet ports at the opposite ends of said gas pump cylinders controlled by said pistons and connected to said common passageway, and inlet ports to said power cylinder from said gas pump cylinders controlled by said gas pump pistons.

14. In an internal combustion engine the combination with a crankshaft, of a power cylinder and a piston working in said cylinder, air inlet ports and exhaust ports controlled by said power piston, an air pump cylinder and a pump piston operating in said cylinder, a gas pump cylinder and a valve piston operating in said cylinder, connections between said pump piston and said valve piston, means coöperating with said crank shaft for operating said pistons so that when the power piston is at the end of its stroke, the pump and valve pistons are substantially at the center of their stroke and vice versa, and a second set of inlet ports to the power cylinder controlled by the valve piston.

15. In an internal combustion engine the combination with the crank shaft, of a power cylinder and a piston working in said cylinder, air inlet ports and exhaust ports controlled by said power piston, an air pump cylinder and a pump piston operating in said cylinder, a gas pump cylinder and a valve piston operating in said cylinder, connections between said pump piston and said valve piston, means coöperating with said crank shaft for operating said pistons so that when the power piston is at the end of its stroke the pump and valve pistons are substantially at the center of their stroke and vice versa, a second set of inlet ports to the power cylinder controlled by the valve piston, and inlet ports to the gas pump cylinder controlled by the valve piston.

16. In an internal combustion engine the combination with the crank shaft, of a power cylinder and a piston working in said cylinder, air inlet ports and exhaust ports controlled by said power piston, an air pump cylinder and a pump piston operating in said cylinder, a gas pump cylinder and a valve piston operating in said cylinder, connections between said pump piston and said valve piston, means coöperating with said crank shaft for operating said pistons so that when the power piston is at the end of its stroke the pump and valve pistons are substantially at the center of their stroke, and vice versa, a second set of inlet ports to the power cylinder controlled by the valve piston, and air inlet ports to the air pump cylinder controlled by the power piston.

17. In an internal combustion engine the combination with a crankshaft, of a power cylinder and a piston operating in said cylinder air inlet ports and exhaust ports controlled by said power piston, an air pump cylinder and a pump piston operating in said cylinder, a gas-pump cylinder having two chambers and a double-acting valve piston operating in said cylinder to pump gas in the two chambers, a passageway connecting the two chambers, a second set of inlet ports to the combustion cylinder jointly controlled by the valve piston and the power piston, and means connected to the crankshaft for operating said pump piston and said valve piston substantially ninety degrees from said power piston.

18. In an internal combustion engine the combination with a crankshaft, of a power cylinder and a piston operating in said cylinder, air inlet ports and exhaust ports controlled by said power piston, an air-pump cylinder and a pump piston operating in said cylinder, a gas-pump cylinder having two chambers and a double-acting valve piston operating in said cylinder to pump gas in the two chambers, a passageway connecting the two chambers, a second set of inlet ports to the power cylinder jointly controlled by the valve piston and the power piston, said valve piston effecting communication through said inlet ports between the two chambers and the power cylinder at the end of its stroke, and means connected to the crankshaft for operating said pump piston and said valve piston substantially ninety degrees from said power piston.

19. In an internal combustion engine the combination with a crankshaft, of a power cylinder and a piston operating in said cylinder, air inlet ports and exhaust ports controlled by said power piston, an air-pump cylinder and a pump piston operating in said cylinder, a gas-pump cylinder having two chambers and a double-acting valve piston operating in said cylinder to pump gas in the two chambers, a passageway connecting the two chambers, a second set of inlet ports to the power cylinder jointly controlled by the valve piston and the power piston, said valve piston effecting communication through said inlet ports between the two chambers and the power cylinder at the end of its stroke, means for supplying air to the power cylinder at the intermediate part of the stroke of said valve piston, and means connected to the crankshaft for operating said pump piston and said valve piston substantially ninety degrees from said power piston.

In testimony whereof I affix my signature in presence of two witnesses.

JAMES JESSEN.

Witnesses:
H. A. BOWMAN,
ALEX LAGAARD.